(12) United States Patent
Starks et al.

(10) Patent No.: US 9,547,555 B2
(45) Date of Patent: Jan. 17, 2017

(54) CHANGE TRACKING USING REDUNDANCY IN LOGICAL TIME

(71) Applicant: Microsoft Technology Licensing, LLC, Redmond, WA (US)

(72) Inventors: John Starks, Seattle, WA (US); Angshuman Bezbaruah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/595,047

(22) Filed: Jan. 12, 2015

(65) Prior Publication Data

US 2016/0203052 A1    Jul. 14, 2016

(51) Int. Cl.
  *G06F 12/02* (2006.01)
  *G06F 11/14* (2006.01)
  *G06F 11/10* (2006.01)

(52) U.S. Cl.
  CPC ....... *G06F 11/1402* (2013.01); *G06F 11/1048* (2013.01); *G06F 11/1448* (2013.01); *G06F 11/1451* (2013.01); *G06F 2201/84* (2013.01)

(58) Field of Classification Search
  CPC .............. G06F 11/1412; G06F 11/1402; G06F 11/1048; G06F 11/1448; G06F 11/1451
  USPC ........ 711/162, 154, 156; 707/625, 639, 640, 707/648, 649, 690, 697, 699
  See application file for complete search history.

(56) References Cited

U.S. PATENT DOCUMENTS

| 5,721,915 | A | 2/1998 | Sockut et al. |
| 6,411,964 | B1 | 6/2002 | Iyer et al. |
| 6,795,966 | B1 | 9/2004 | Lim et al. |
| 6,981,114 | B1 | 12/2005 | Wu et al. |
| 7,162,662 | B1 | 1/2007 | Svarcas et al. |
| 7,249,262 | B2* | 7/2007 | Hauck ............... H04L 63/08 709/219 |

(Continued)

FOREIGN PATENT DOCUMENTS

CN    103946807 A    7/2014

OTHER PUBLICATIONS

Werneburg, Ken, "VMware vSphere® Replication 5.5 Overview", In Technical White Paper, Nov. 16, 2013, 14 pages.

(Continued)

*Primary Examiner* — Stephen Elmore
(74) *Attorney, Agent, or Firm* — John Jardine; Daniel Choi; Micky Minhas

(57) ABSTRACT

Tracking changes amongst unit portions (e.g., blocks or files) of a storage system. A logical time identifier is associated with each unit portion and is included within a logical time identifier structure. When writing to a particular write portion, the mechanism updates the appropriate logical time identifiers, calculates redundancy data of a group of one or more logical time identifiers associated with the unit portion (s) of the write portion. Furthermore, the write portion of the storage system is written. In addition, the corresponding redundancy data for that write portion is written to the logical time identifier structure. Later, for a given write portion, the redundancy data is verified to be consistent or inconsistent with the group of one or more logical time identifiers associated with the write portion. If the redundancy data is not consistent, then a current logical time identifier is assigned to each of the logical time identifiers.

22 Claims, 10 Drawing Sheets

(56) References Cited

U.S. PATENT DOCUMENTS

| | | | |
|---|---|---|---|
| 7,328,366 B2* | 2/2008 | Michelman | G06F 11/1458 711/162 |
| 7,447,854 B1 | 11/2008 | Cannon | |
| 7,516,286 B1 | 4/2009 | Dalal et al. | |
| 7,519,858 B2 | 4/2009 | Korlepara | |
| 7,574,459 B2* | 8/2009 | Sen | G06F 11/1448 |
| 7,860,837 B2* | 12/2010 | Ali | G06F 11/1448 707/649 |
| 7,865,470 B2* | 1/2011 | Fries | G06F 11/1451 707/640 |
| 8,055,613 B1* | 11/2011 | Mu | G06F 11/1451 707/610 |
| 8,145,601 B2* | 3/2012 | Zizys | G06F 11/1451 707/640 |
| 8,335,902 B1 | 12/2012 | Feathergill | |
| 8,356,013 B2 | 1/2013 | Fachan et al. | |
| 8,356,148 B2 | 1/2013 | Popovski et al. | |
| 8,443,166 B2 | 5/2013 | Czezatke et al. | |
| 8,463,747 B2* | 6/2013 | Wahlert | G06F 21/6227 707/640 |
| 8,463,749 B2* | 6/2013 | Zizys | G06F 11/1451 707/649 |
| 8,468,609 B2* | 6/2013 | Leggette | G06F 11/1004 709/216 |
| 8,538,919 B1 | 9/2013 | Nielsen et al. | |
| 8,560,855 B2* | 10/2013 | Resch | G06F 11/1004 713/168 |
| 8,712,970 B1 | 4/2014 | Sim-Tang | |
| 8,726,127 B2* | 5/2014 | Grube | H04L 67/1097 707/822 |
| 8,726,273 B2 | 5/2014 | Le | |
| 8,751,515 B1 | 6/2014 | Xing et al. | |
| 8,782,086 B2* | 7/2014 | Resch | G06F 11/1004 707/783 |
| 8,788,773 B2 | 7/2014 | Goodman et al. | |
| 8,805,788 B2 | 8/2014 | Gross et al. | |
| 8,813,204 B2* | 8/2014 | Leggette | G06F 11/1004 726/7 |
| 8,966,341 B2* | 2/2015 | Grube | H04L 67/1097 707/822 |
| 9,081,714 B2* | 7/2015 | Grube | H04L 67/1097 |
| 9,081,715 B2* | 7/2015 | Grube | H04L 67/1097 |
| 9,086,994 B2* | 7/2015 | Resch | G06F 11/1004 |
| 9,130,957 B2* | 9/2015 | Yamaura | H04L 29/12028 |
| 9,276,980 B2* | 3/2016 | Chan | G06F 17/30085 |
| 9,430,272 B2* | 8/2016 | Bezbaruah | G06F 9/45558 |
| 2008/0126445 A1* | 5/2008 | Michelman | G06F 11/1458 |
| 2008/0140963 A1 | 6/2008 | Thomason et al. | |
| 2010/0049929 A1 | 2/2010 | Nagarkar et al. | |
| 2010/0228913 A1 | 9/2010 | Czezatke et al. | |
| 2010/0262585 A1 | 10/2010 | Rosikiewicz et al. | |
| 2010/0274980 A1 | 10/2010 | Stringham | |
| 2011/0167196 A1 | 7/2011 | Scales et al. | |
| 2012/0072659 A1 | 3/2012 | Wade et al. | |
| 2013/0067179 A1 | 3/2013 | Paleologu et al. | |
| 2013/0254479 A1 | 9/2013 | Czezatke et al. | |
| 2013/0290782 A1 | 10/2013 | Chen et al. | |
| 2014/0025913 A1 | 1/2014 | Fuente et al. | |
| 2014/0040572 A1 | 2/2014 | Kotagiri et al. | |
| 2014/0164722 A1 | 6/2014 | Garthwaite et al. | |
| 2014/0236892 A1 | 8/2014 | Blyler et al. | |
| 2014/0250347 A1* | 9/2014 | Grube | H04L 67/1097 714/770 |
| 2014/0337666 A1* | 11/2014 | Resch | G06F 11/1004 714/6.22 |
| 2014/0337932 A1* | 11/2014 | Leggette | G06F 11/1004 726/4 |

OTHER PUBLICATIONS

"Advanced Restore—Virtual Server Agent for VMware", Retrieved on: Nov. 7, 2014, Available at: http://documentation.commvault.com/commvault/v10/article?p=products/vs_vmware/restore_adv.htm, pp. 1-32.

Sinofsky, Steven, "Building the Next Generation File System for Windows: ReFS", Published on: Jan. 17, 2012, Available at: http://blogs.msdn.com/b/b8/archive/2012/01/16/building-the-next-generation-file-system-for-windows-refs.aspx, pp. 1-45.

"What's New in Hyper-V for Windows Server 2012", Published on: Feb. 29, 2012, Available at: http://technet.microsoft.com/en-in/library/hh831410.aspx, pp. 1-6.

Ramdas, Aashish, "Resynchronization of Virtual Machines in Hyper-V Replica", Published on: May 10, 2013, Available at: http://blogslechnet.com/b/virtualization/archive/2013/05/10/resynchronization-of-virtual-machines-in-hyper-v-replica.aspx, pp. 1-5.

"Changed Block Tracking (CBT) on Virtual Machines (1020128)", Retrieved on: Nov. 7, 2014, Available at: http://kb.vunware.com/selfservice/microsites/search.do?language=en_US&cmd=displayKC&externalId=1020128, pp. 1-2.

"High Availability and Data Protection with EMC Isilon Scale-Out NAS", In White Paper, Nov. 2013, 36 pages.

Park, et al., "Fast and Space-Efficient Virtual Machine Checkpointing", In Proceedings of ACM SIGPLAN/SIBOPS International Conference o Virtual Execution Environments, Mar. 9, 2011, pp. 75-85.

Garg, et al., "Checkpoint-Restart for a Network of Virtual Machines", 2013, IEEE, 8 pages.

Office Action dated Dec. 3, 2015 cited in U.S. Appl. No. 14/573,976 (Copy Attached) pp. 1-20.

"International Search Report and Written Opinion Issued in PCT Application No. PCT/US2015/067761", Mailed Date: May 24, 2016, 12 Pages.

"International Search Report and Written Opinion issued in PCT Application No. PCT/US2015/063565", Mailed Date: Jun. 30, 2016, 20 pages.

Notice of Allowance dated Jun. 7, 2016 cited in U.S. Appl. No. 14/573,976 (Copy Attached).

* cited by examiner

CHANGE TRACKING USING REDUNDANCY IN LOGICAL TIME

BACKGROUND

Computing systems and associated networks have revolutionized the way human beings work, play, and communicate, heralding in what is now termed the "information age". Data management is thus an important field in modern times. One aspect of data management is change tracking. For instance, it is often helpful to be able to distinguish what portions of data have changed between two instances in time.

As an example, when backing up a storage system, a copy of the storage system is written to a backup site. The next time the storage system is backed up, rather than copy again the entire storage system, only a changed subset of the storage system is backed up. Accordingly, to perform this incremental backup, determining which portions of the storage system have changed is a prerequisite. Furthermore, when recovering a storage system to a particular logical time (e.g., as during a recovery), change tracking allows the recovery system to determine which portions of the data are consistent with the state of the storage system at that particular logical time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to tracking changes amongst unit portions of a storage system. As an example, the unit portions might be files in a file system, or blocks in block-based storage system. For each at least some of the unit portions of the storage system, a logical time identifier is associated with unit portion and is included within a logical time identifier structure.

When writing to a particular write portion that includes one or more unit portions of the storage system, the logical time identifier is updated for any changed unit portions within the write portion. Furthermore, once the appropriate logical time identifier(s) has changed, the mechanism calculates redundancy data, such as a checksum, of a group of one or more logical time identifiers associated with the one or more portions of the write portion. The write portion of the storage system is written. In addition, the corresponding redundancy data for the group of logical time identifiers associated with that write portion is written to the logical time identifier structure.

Later, for a given write portion, the redundancy data is verified to be consistent or inconsistent with the group of one or more logical time identifiers associated with the write portion. If the redundancy data is not consistent, then a current logical time identifier is assigned to each of the logical time identifiers. Accordingly, inconsistent write portions are treated as recently written to. During incremental backup, the logical time identifiers are used to determine which unit portions have changed, and thus to determine which unit portions need to be backed up. Since inconsistent redundancy data for a write portion results in the logical time identifiers for the entire write portion receiving the current logical time, this causes the appearance to the backup system that all unit portions of that write portion have been newly written to. Accordingly, the backup system causes the entire write portion to be backed up, even though one or more of its unit portions might not have changed. While this might perhaps result in more backup data being transferred than absolutely necessary in the rare case that the redundancy data loses consistency, it protects against data inconsistency when such cases occur.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
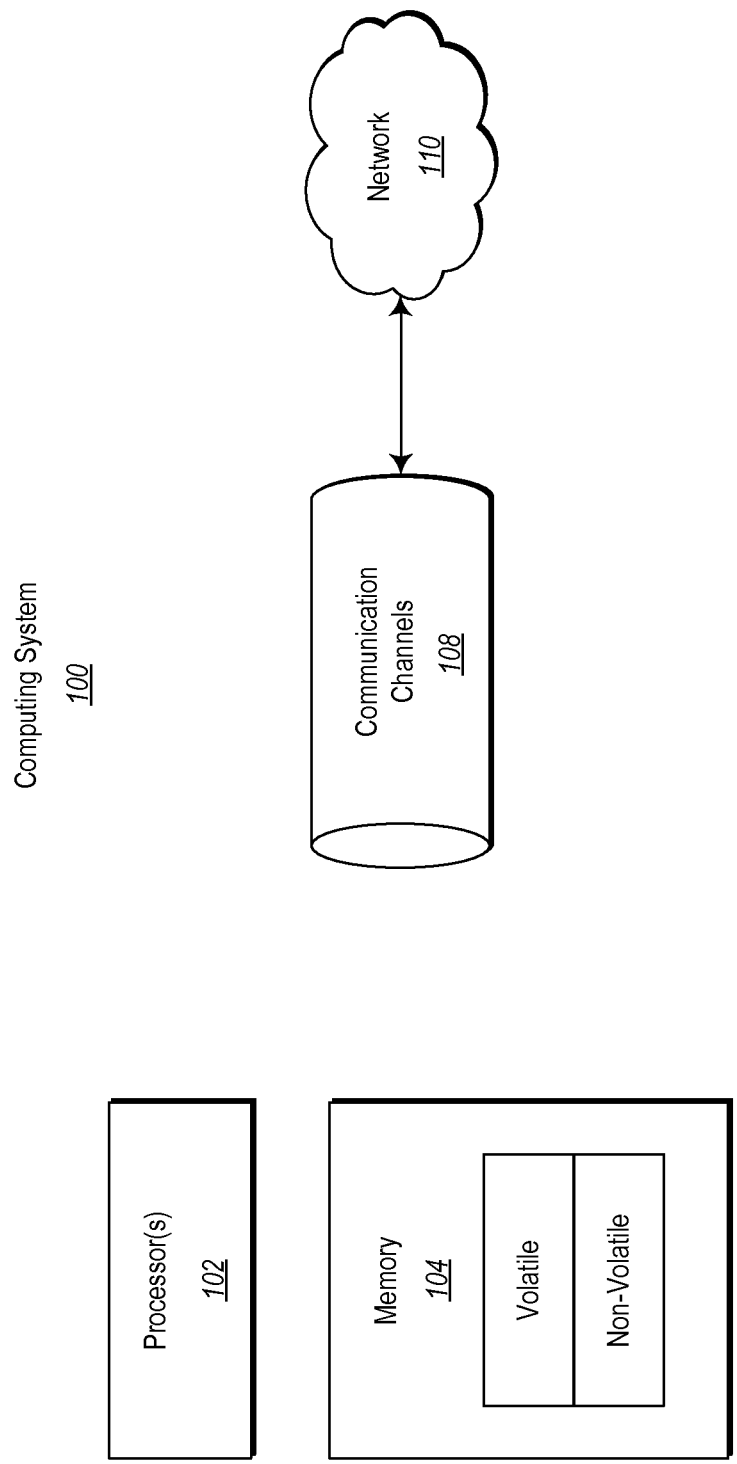
FIG. 1 abstractly illustrates a computing system in which some embodiments described herein may be employed.

At least some embodiments described herein relate to tracking changes amongst unit portions of a storage system. As an example, the unit portions might be files in a file system, or blocks in block-based storage system. For each at least some of the unit portions of the storage system, a logical time identifier is associated with unit portion and is included within a logical time identifier structure.

When writing to a particular write portion that includes one or more unit portions of the storage system, the logical time identifier is updated for any changed unit portions within the write portion. Furthermore, once the appropriate logical time identifier(s) has changed, the mechanism calculates redundancy data, such as a checksum, of a group of one or more logical time identifiers associated with the one or more portions of the write portion. The write portion of the storage system is written. In addition, the corresponding redundancy data for the group of logical time identifiers associated with that write portion is written to the logical time identifier structure.

Later, for a given write portion, the redundancy data is verified to be consistent or inconsistent with the group of one or more logical time identifiers associated with the write portion. If the redundancy data is not consistent, then a current logical time identifier is assigned to each of the logical time identifiers. Accordingly, inconsistent write portions are treated as recently written to. During incremental backup, the logical time identifiers are used to determine which unit portions have changed, and thus to determine which unit portions need to be backed up. Since inconsistent redundancy data for a write portion results in the logical time identifiers for the entire write portion receiving the current logical time, this causes the appearance to the backup system that all unit portions of the write portion have been newly written to. Accordingly, the backup system causes the entire write portion to be backed up, even though one or more of the unit portions might not have changed. While this might perhaps result in more backup data being transferred than absolutely necessary in the rare case that the redundancy data loses consistency, it protects against data inconsistency when such cases occur.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
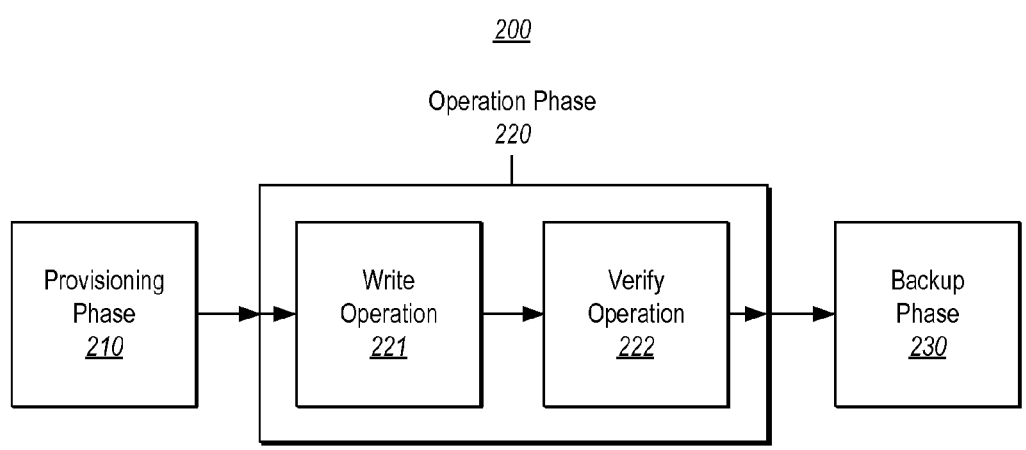
FIG. 2 illustrates a timeline of operation in accordance with the principles described herein, and includes a provisioning phase, an operation phase (including write and verify operations) and a backup phase.

FIG. 2 illustrates a timeline 200 of operation in accordance with the principles described herein. First, is a provisioning phase 210 in which a computing system prepares for operation to keep track of changes in a storage system by setting up a logical time identifier structure. Second, is an operation phase 220 in which the computing system engages in normal operation and as such performs write operations 221 to the storage system and equivalent writes to the logical time identifier structure, and then later verifies 222 consistency of the write operations using the logical time identifier structure in accordance with the principles described herein. Finally, there is a potential backup phase 230 in which the logical time identifier structure is used to backup the storage system to a consistent state.

Figure 3:
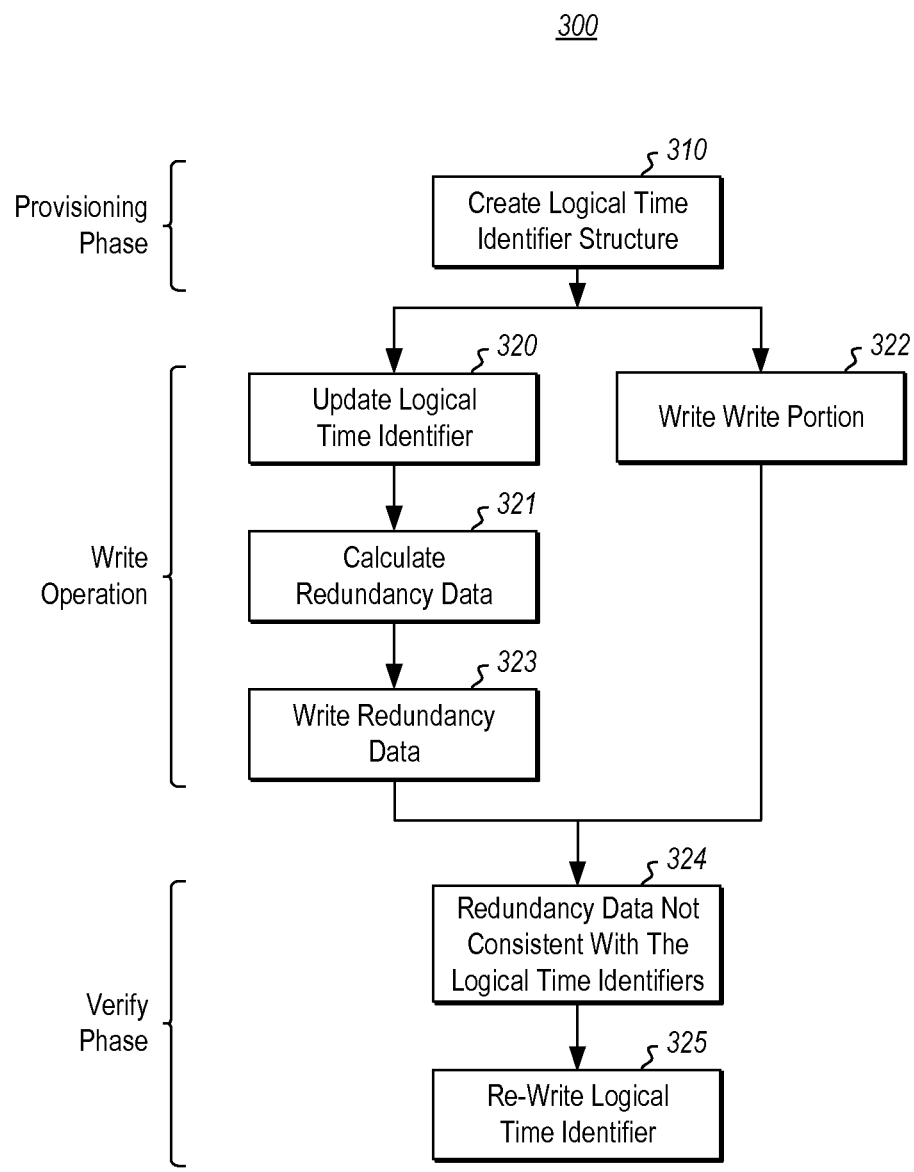
FIG. 3 illustrates a method for keeping track of changes amongst unit portions of a storage system.
Figure 4:
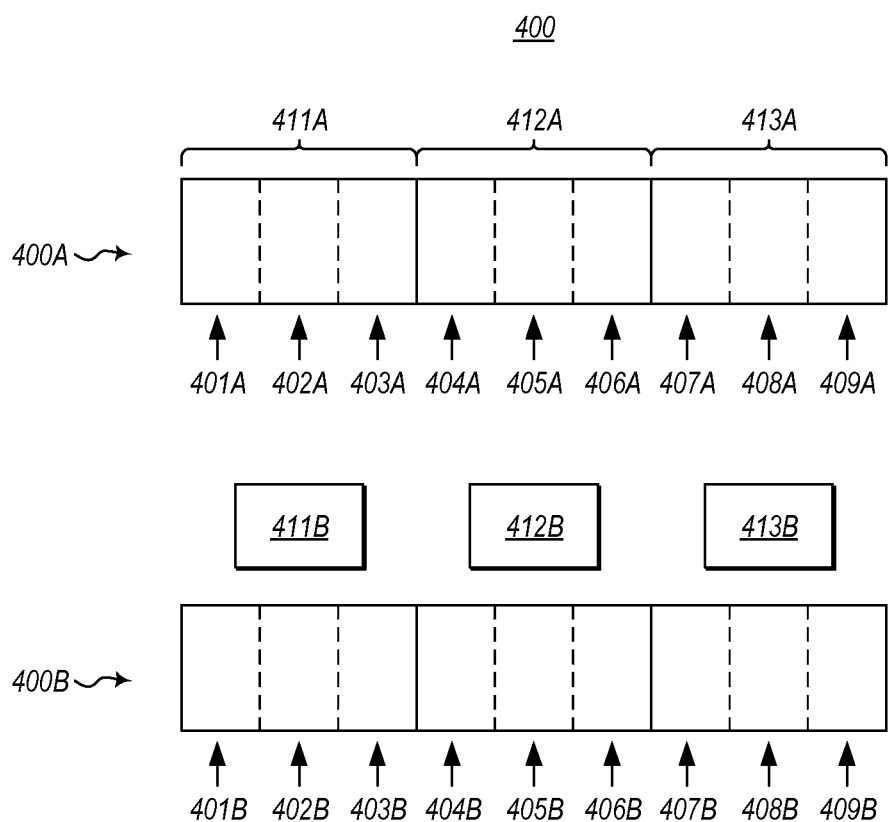
FIG. 4 illustrates an example storage system that includes data storage and a logical time identifier structure.

More specifically, FIG. 3 illustrates a flowchart of a method 300 for keeping track of changes amongst portions of a storage system. In the provisioning phase 210, a logical time identifier is associated with each unit portion in a logical time identifier structure (act 310). FIG. 4 illustrates an example storage system 400 that includes a logical time identifier structure. The example of FIG. 4 will be described prior to returning to the flowchart of the method 300 of FIG. 3.

As an example, FIG. 4 illustrates an example storage system 400 that includes data storage 400A and a logical time identifier structure 400B. The data storage 400A includes unit portions 401A through 409A. In one embodiment, the storage system 400A is a file system in which each unit portion 401A through 409A is a file. However, the storage system 400A might also be a block-based system in which each unit portion 401A through 409A is a block. Of course, there may be many more unit portions in a typical storage system, but the example of FIG. 4 is kept simple for purposes of clarity.

The storage system 400A also includes write portions 411A through 413A. In accordance with the broadest aspect described herein, the write portions may include one or more unit portions, and represent how the unit portions may be written into the storage system. For instance, if the storage system 400A is a file system, then typically, one file is written at a time. Accordingly, the write portions might contain just one unit portion (i.e., one file) each. However, if the storage system 400A is a block-based storage system, then typically the blocks are written one page at a time, with one page encompassing multiple blocks. In the illustrated example, the write portions 411A through 413A are each represented as encompassing three unit portions each. This is again for purposes of simplicity and clarity in describing the example. In a typical storage system, there may be millions or billions of unit portions and write portions, and each write portion can potentially encompass different numbers of unit portions.

The logical time identifier structure 400B includes logical time identifiers 401B through 409B associated with each of the unit portions 401A through 409A, respectively. FIG. 5A through 5G illustrates progressive states of the logical time identifier structure 400B as the state will be in a particular example described hereinafter. In the example of FIGS. 5A through 5G, the logical time identifier structure including a linear array of entries, with each entry being a logical time identifier for an associated unit portion of the storage system. FIGS. 6A through 6F illustrates progressive states of the logical time identifier structure 400B, in which a tree structure is used to track redundancy data. FIGS. 5A through 5D correspond to FIGS. 6A through 6D, respectively. FIGS. 5E and 5F correspond to FIG. 6E. FIGS. 5F and 5G correspond to FIGS. 6E and 6F, respectively. Accordingly, the examples of FIGS. 5A through 5G, as well as FIGS. 6A through 6F, will be referred to frequently in describing the scenario below.

In the particular example of FIGS. 5A through 5G and FIGS. 6A through 6F, the logical time identifiers are sequence numbers, and logical time is represented by a sequence number that increments by one each time logical time advances. For instance, in state 500A of FIG. 5A, and in state 600A of FIG. 6A, the logical time identifiers 401B through 409B are each zero'ed out. In some cases, the logical time identifiers might be associated with a real time, such that a real time may be entered, and the corresponding logical time identifier may be retrieved.

Referring again to FIG. 4, the group of logical time identifiers for each of the write portions 411A through 413A has associated redundancy data 411B through 413B, respectively. The redundancy data 411B through 413B may be used to confirm correctness of the logical time identifiers within the corresponding write portions 411A through 413A, respectively. For instance, the write portion 411A is associated with unit portions 401A through 403A; and the unit portions 401A through 403A have associated logical time identifiers 401B through 403B. Accordingly, the redundancy data 411B represents redundancy data (e.g., a checksum) that may be used to verify accuracy of the logical time identifiers 401B through 403B. Also, the write portion 412A is associated with unit portions 404A through 406A; and the unit portions 404A through 406A have associated logical time identifiers 404B through 406B. Accordingly, the redundancy data 412B represents redundancy data (e.g., a checksum) that may be used to verify accuracy of the logical time identifiers 404B through 406B. Finally, the write portion 413A is associated with unit portions 407A through 409A; and the unit portions 407A through 409A have associated logical time identifiers 407B through 409B. Accordingly, the redundancy data 413B represents redundancy data (e.g., a checksum) that may be used to verify accuracy of the logical time identifiers 407B through 409B.

Figure 5A:
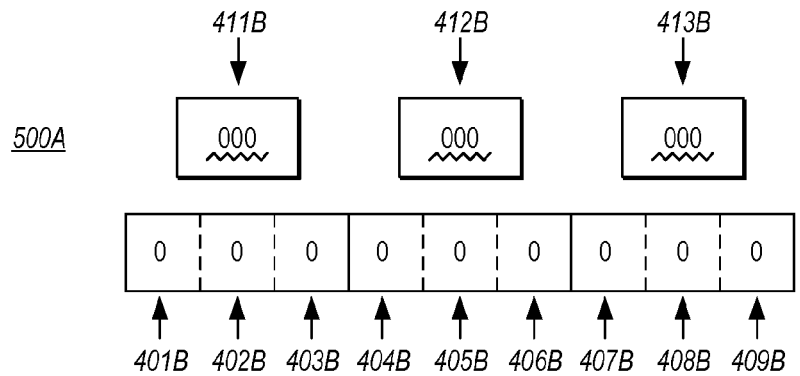
FIGS. 5A through 5G illustrate various stages of one embodiment of the logical time identifier structure of FIG. 4 following along a particular scenario, and in which the logical time identifier structure is arranged as a linear array of logical time identifiers.

With the logical time identifiers 401A through 409A being zero'ed out in FIG. 5A, the redundancy data 411B, 411B and 411C each represent the redundancy data for three zero's. In the nomenclature of the illustrated FIGS. 5A through 5G, redundancy data for a sequence of numbers is symbolized by having the sequence of numbers illustrated with a jagged underline. For instance, in FIG. 5A, the redundancy data 411B is represented as having value 000.

FIGS. 6A through 6F illustrate various stages of another embodiment of the logical time identifier structure of FIG. 4 following along the same particular scenario as was described with respect to FIGS. 5A through 5G. However, in this second embodiment, the logical time identifier structure may take the form of a tree structure.

In this tree structure, if a write portion does not have an associated group of logical time identifiers, then the logical time identifiers are assumed to be a default value represented by a root node in the tree. If any of the group of logical time identifier structures for a write portion is different than the default value represented at the root node, then that group of logical time identifier structures will have its own child node. If the group of logical time identifiers are the same for a given write portion, then the child node will simply hold that value. If each of the group of logical time identifiers are not the same for the write portion, then the child node will contain the redundancy data for the series of logical time identifiers.

Figure 6A:
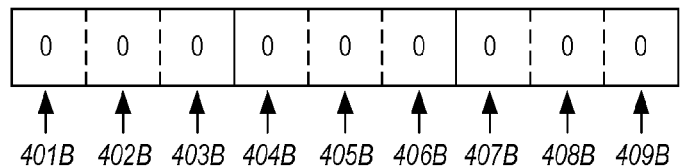
FIGS. 6A through 6F illustrate various stages of another embodiment of the logical time identifier structure of FIG. 4 following along the particular scenario, and in which the logical time identifier structure is arranged as a tree structure.
Figure 6B:
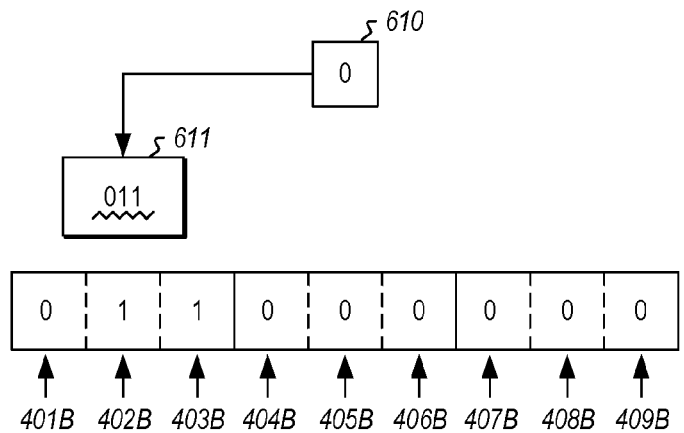
Figure 6C:
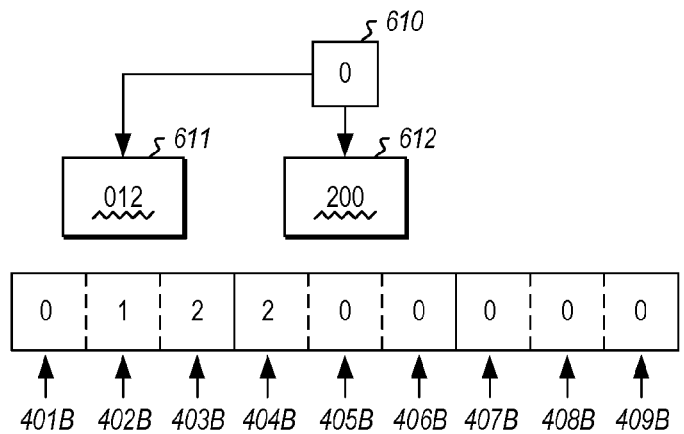
Figure 6D:
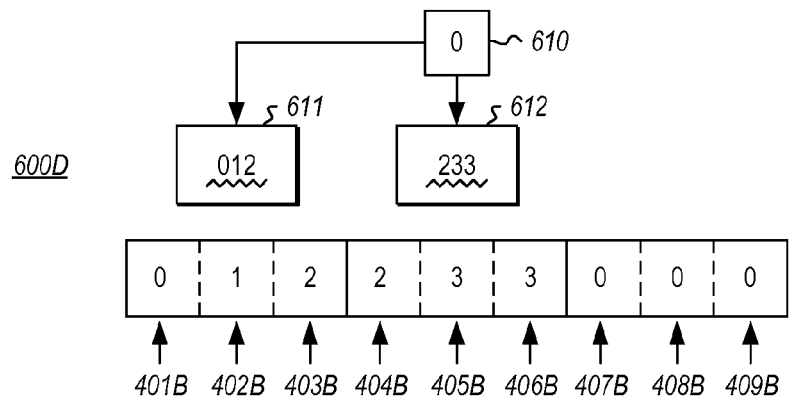
Figure 6E:
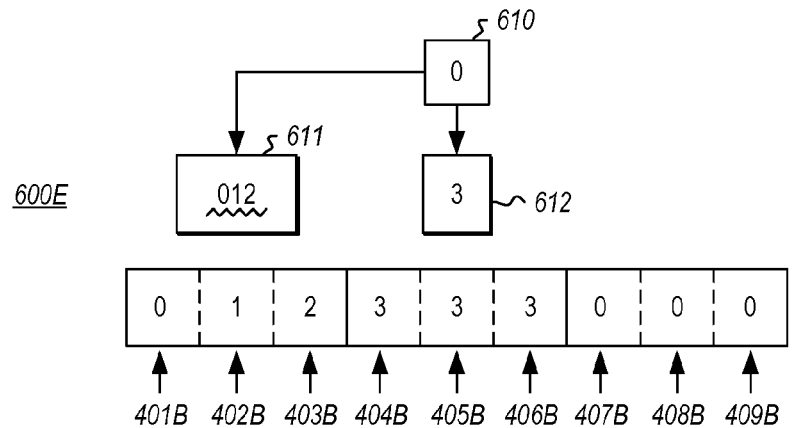
Figure 6F:
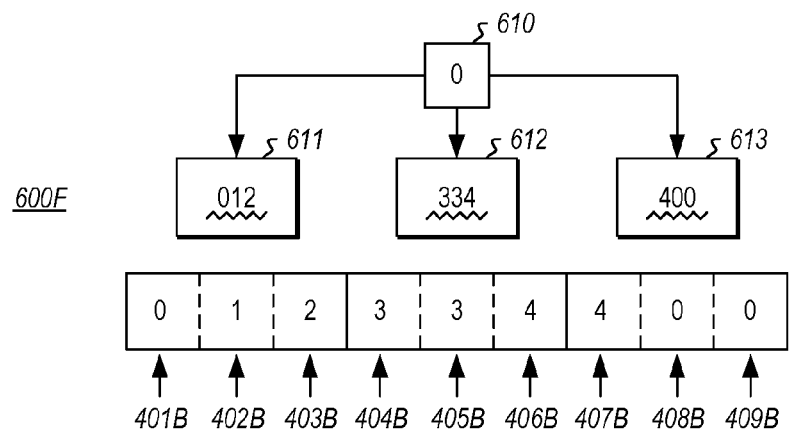

For instance, referring to the example of FIG. 6A, none of the logical time identifiers are different than a default value of zero. Accordingly, since the values of the logical time identifiers 401B through 409B are each 0, there is but a single root node 610 that represents the value 0.

Moving onto the writing operation 221 of the phase 220, when writing to a particular write portion that includes unit portion(s) of the storage system, the system updates the logical time identifiers for any of the unit portion(s) of the write portion that have changed (act 320), and calculates the redundancy data (e.g., a checksum) associated with a logical time identifier(s) associated with the unit portion(s) of the write portion (act 321). The system writes the write portion (act 322) and also writes the associated redundancy data (act 323). In some embodiments, the redundancy data is written (act 323) in parallel with the updating of the logical time identifiers (act 320). Accordingly, if the redundancy data is later found to be inconsistent with the logical time identifiers (act 324), then a power failure has likely occurred, and the logical time identifiers may be treated as corrupt. This is why the logical time identifiers are, in that case, marked with the current logical time as measured by the application using the data.

Figure 5B:
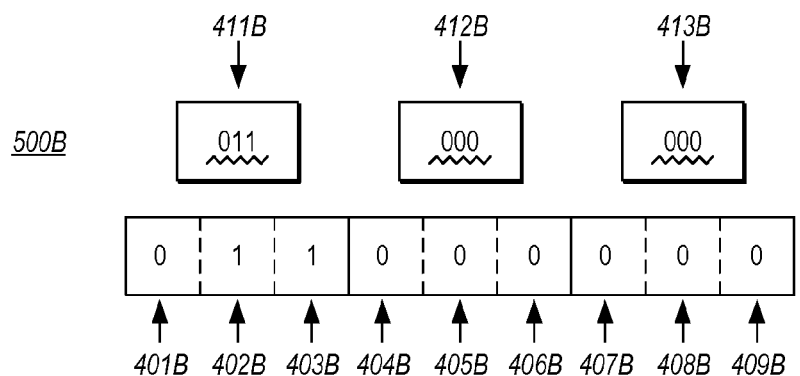

For instance, referring to the state 500B of FIG. 5B, suppose that a write is made to unit portions 402A and 403A, and that logical time has advanced to time 1. Accordingly, the logical time identifiers 401B through 403B of the corresponding unit portions 401A through 403A for write portion 411A change from 000 to 011 (act 320). The redundancy data 411B is then recalculated (act 321) as 011. The system then writes the new write portion 411A to the unit portions 401A through 403A (act 322), and also writes the new redundancy data 411B now having value 011 (act 323). Referring to the state 600B of FIG. 6B, since the write portion 411A is no longer accurately represented by the root node 610, a leaf node 611 is created, which contains the redundancy data (e.g., a checksum) for the logical time identifiers 401B through 403B.

Figure 5C:
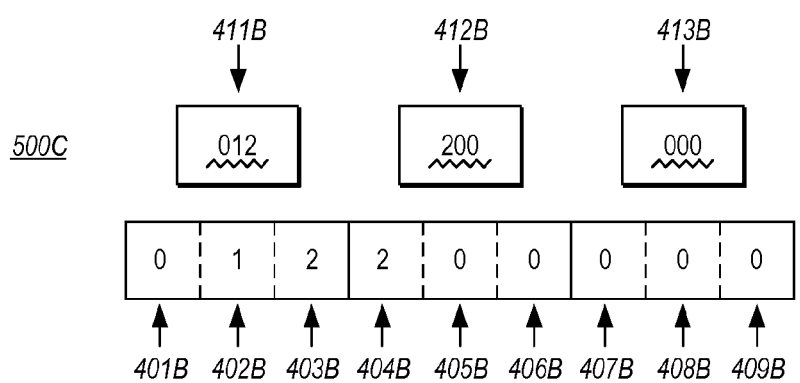

Next, referring to state 500C of FIG. 5C, suppose that a write is made to unit portions 403A and 404A, and that logical time has advanced to time 2. Accordingly, the logical time identifiers 401B through 403B of the corresponding unit portions 401A through 403A for write portion 411A change from 011 to 012 (act 320). Furthermore, the logical time identifiers 404B through 406B of the corresponding unit portions 404A through 406A for write portion 412B change from 000 to 200 (also act 320). The redundancy data 411B is then recalculated (act 321) as 012. In addition, the redundancy data 412B is then recalculated (also act 321) as 200. The system then writes the new write portion 411A to the unit portions 401A through 403A (act 322), the new write portion 412A of the unit portions 404A through 406A (also act 322), the new redundancy data 411B now having value 012 (act 323), and the new redundancy data 412B now having value 200 (also act 323). Referring to the state 600C of FIG. 6C, since the write portion 412A is no longer accurately represented by the root node 610, a leaf node 612 is created, which contains the redundancy data (e.g., a checksum) for the logical time identifiers 404B through 404B. Furthermore, the leaf node 611 has been altered in the same manner as the redundancy data 411B.

Figure 5D:
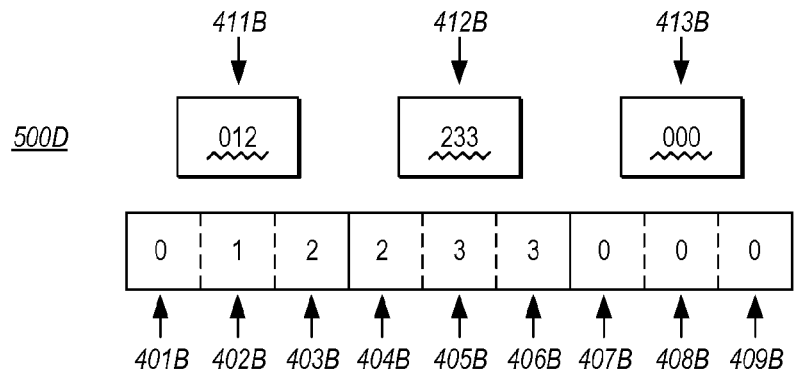
Figure 5E:
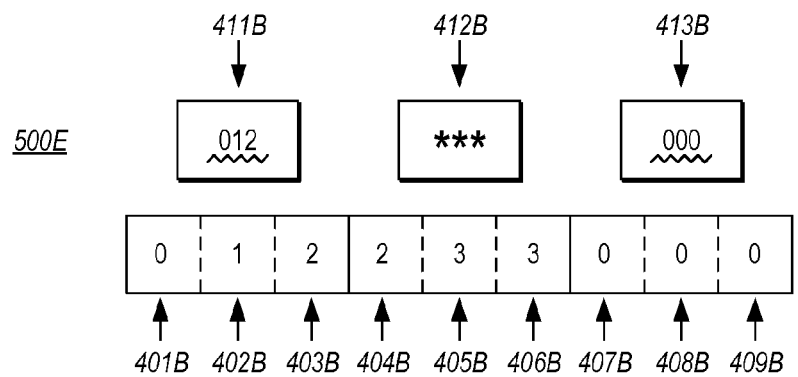
Figure 5F:
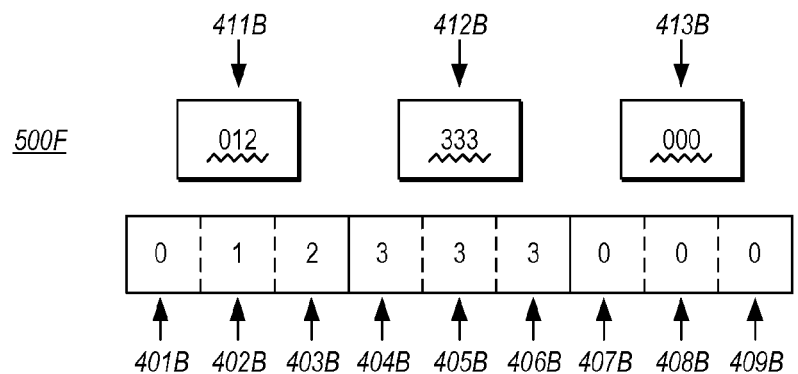
Figure 5G:
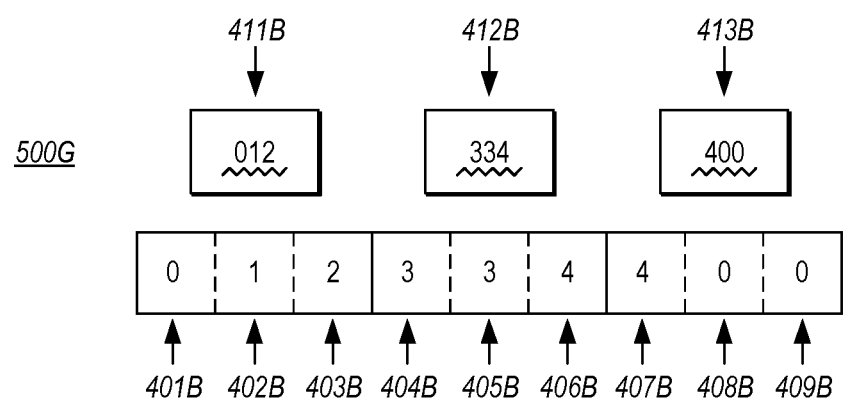

Next, referring to state 500D of FIG. 5D, suppose that a write is made to unit portions 405A and 406A, and that logical time has advanced to time 3. Accordingly, the logical time identifiers 404B through 406B of the corresponding unit portions 404A through 406A for write portion 412A change from 200 to 233 (act 320). The redundancy data 412B is then recalculated (act 321) as 233. The system then writes the new write portion 412A to the unit portions 404A through 406A (act 322), and also writes the new redundancy data 412B now having value 233 (act 323). Similarly, referring to the state 600D of FIG. 6D, the value of the leaf node 612 also changes accordingly.

Referring back to FIG. 2, during the operational phase 220, a verify operation 222 may be occasionally performed. This verify operation 222 may be performed in response to certain events, and/or might be periodically performed. As an example, the verify operation 222 might be performed after a power cycle has been detected to occur in the system.

During a verify operation 222, it might be verified after the write operation 221 that the redundancy data is not consistent with the group of one or more logical time identifiers (act 324). If the redundancy data is not consistent, then a write operation 221 is performed with respect to the current logical time 3 for all of the unit portions in the corresponding write portion.

For instance, referring to state 500E of FIG. 5E, suppose that while still at logical time 3, that the redundancy data 412B now has a corrupt value (represented by "***") that is no longer consistent with the value 233 of the logical time identifiers 404B through 406B of the unit portions 404A through 406A associated with the corresponding write portion 412A (act 324). In that case, as represented in the state of FIG. 5F, the logical time identifiers 404B through 406B of the corresponding unit portions 404A through 406A of the write portion 412A are each re-written with current logical time identifier 3 (act 325). The new redundancy data 412B is then calculated as 333, (act 321), and the redundancy data is written (act 323). Referring to the state 600E of FIG. 6E, since the logical time identifiers 404B through 406B of the write portion corresponding to leaf node 611 are now all of the same (logical time 3), the leaf node 612 may optionally transform to having a simple value of 3. Alternatively, the leaf node 612 could have had the redundancy value of 333.

In other words, if the redundancy data (e.g., the checksum) is incorrect, the entire associated write portion is treated as though it has the latest sequence number. The next time the write portion is updated, the current logical time is explicitly stored for each logical time identifier for that write portion. This means that if the page becomes corrupt somehow, when the user requests the set of changes from time t (which is less than the current time), the user will see that everything represented by this part of the logical time identifier structure) has changed, even though only some or even none of the unit portions of this write portion have changed. This is much safer than assuming nothing changed (since it is unknown what changed).

Next, referring to the state 500G of FIG. 5G, suppose that a write is made to unit portions 406A and 407A, and that logical time has advanced to time 4. Accordingly, the logical time identifiers 404B through 406B of the corresponding unit portions 404A through 406A for write portion 412A change from 333 to 334 (act 320). Furthermore, the logical time identifiers 407B through 409B of the corresponding unit portions 407A through 409A for write portion 413A change from 000 to 400 (also act 320). The redundancy data 412B is then recalculated (act 321) as 334. In addition, the redundancy data 413B is then recalculated (also act 321) as 400. The system then writes the new write portion 412A to the unit portions 404A through 406A (act 322), the new write portion 413A of the unit portions 407A through 409A (also act 322), the new redundancy data 412B now having value 334 (act 323), and the new redundancy data 413B now having value 400 (also act 323). Referring to the state 600F of FIG. 6F, since the write portion 413A is no longer accurately represented by the root node 610, a leaf node 613 is created, which contains the redundancy data (e.g., a checksum) for the logical time identifiers 407B through 409B. Furthermore, since the value in the leaf node 612 (of 3) no longer represents all of the logical time identifiers of the write portion 412A, the leaf node 612 is modified to include the redundancy data 334.

Referring again to FIG. 4, now suppose that the storage system 400 needs to be backed up. For instance, in FIG. 2, the timeline 200 proceeds from normal operation phase 220 to the backup phase 230. The logical time identifiers are used by the backup system to determine what unit portions have changed. For instance, referring to FIGS. 5G and 6F, if the last backup was taken after logical time 0 but before logical time 1, then unit portions 402A through 407A are to be backed up since their respective logical time identifiers 402B through 407B are each logical time 1 or later. If the last backup was taken after logical time 1 but before logical time 2, then unit portions 403A through 407A are to be backed up since their respective logical time identifiers 403B through 407B are each logical time 2 or later. If the last backup was taken after logical time 2 but before logical time 3, then unit portions 404A through 407A are to be backed up since their respective logical time identifiers 404B through 407B are each logical time 3 or later. If the last backup was taken after logical time 3 but before logical time 4, then unit portions 406A and 407A are to be backed up since their respective logical time identifiers 406B and 407B are each logical time 4 or later.

Figure 7:
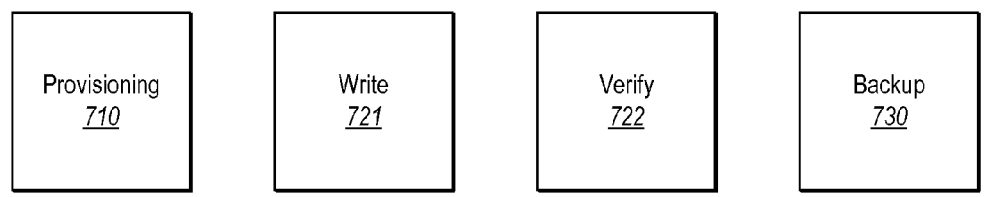
FIG. 7 abstractly illustrates various processing components that may operate within the storage system to provision, operate, and backup the storage system.

Since inconsistent redundancy data for a write portion results in the logical time identifiers for the entire write portion receiving the current logical time, this causes the appearance to the backup system that all unit portions of that write portion have been newly written to. Accordingly, the backup system causes the entire write portion to be backed up, even though one or more of the unit portions might not have changed. While this might perhaps result in more backup data being transferred than absolutely necessary in the rare case that the redundancy data loses consistency, it protects consistency of the actual data when such cases occur FIG. 7 abstractly illustrates an architecture 700 that includes various processing components that may operate within the storage system to provision, operate, and backup the storage system. In particular, a provisioning component 710 may be structured and configured to perform the operations described above for the provisioning phase 210, a write component 721 may be structured and configured to perform the write operations 221, a verify component 722 may be structured and configured to perform the verify operations 222, and a backup component 730 may be structured and configured to perform the operations described above for the backup phase 230.

Accordingly, the principles described herein provide an efficient mechanism for keeping track of changes between arbitrary versions of a storage system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
one more processors;
one or more computer-readable media having thereon computer-executable instructions that are structured such that when executed by the one or more processors, the computing system is caused perform a method for keeping track of changes amongst unit portions of a storage system, the method comprising:
for each unit portion in the storage system, associating a logical time identifier with the unit portion;
when writing to a particular write portion that includes one or more of the unit portions of the storage system, performing the following:
an act of updating the logical time identifier for any unit portion within the particular write portion that has changed;
an act of calculating redundancy data associated with a group of one or more logical time identifiers associated with the one or more portions of the write portion; and
an act of writing to the write portion of the storage system
an act of later verifying that the redundancy data is not consistent with the group of one or more logical time identifiers; and
if the redundancy data is not consistent, assigning a more recent logical time identifier to each of the logical time identifiers in the group of one or more logical time identifiers in the logical time identifier structure, such that inconsistent write portions are treated as more recently written to when backing up.

2. The system in accordance with claim 1, the storage system being a virtual hard drive.

3. The system in accordance with claim 1, the storage system being a file system, and the unit portions of the storage system being files.

4. The system in accordance with claim 1, the storage system being a block-based storage system, and the unit portions of the storage system being blocks.

5. The system in accordance with claim 4, the write portion being a page of multiple blocks.

6. The system in accordance with claim 1, the redundancy data being a checksum.

7. The system in accordance with claim 1, the logical time identifiers comprising sequence numbers.

8. The system in accordance with claim 1, each of at least some of the logical time identifiers associated with a real time.

9. The system in accordance with claim 1, wherein the act of later verifying that the redundancy data is not consistent with the group of one or more logical time identifiers occurs after a power cycle has been detected to occur, and after the write portion has been written.

10. The system in accordance with claim 1, further comprising:
an act of backing up the storage system to a particular logical time using the logical time identifier structure, the more recent logical time identifier being more recent than the particular logical time.

11. The method in accordance with claim 1, wherein for each unit portion in the storage system, the associated logical time identifier with the unit portion is included within a logical time identifier structure.

12. The method in accordance with claim 11, wherein when writing to the particular write portion that includes one or more of the unit portions of the storage system, the method includes also performing an act of writing the redundancy data corresponding to the write portion to the logical time identifier structure.

13. A computer program product comprising one or more computer-readable storage media having thereon computer-executable instructions that are structured such that, when executed by one or more processors of a computing system, cause the computing system to instantiate and/or operate the following:
a logical time identifier structure that associates a logical time identifier with each unit portion of a storage system;
a write component that is configured to write to write portions of the storage system, each write portion consisting of one or more unit portions, by performing the following: an act of updating the logical time identifier for any unit portion within the particular write portion that has changed; an act of calculating redundancy data associated with a group of one or more logical time identifiers associated with the one or more unit portions of the write portion, an act of writing to the write portion of the storage system; and an act of writing the redundancy data corresponding to the write portion to the logical time identifier structure that corresponds to the write portion; and
a verification component that is configured to later perform the following for each of at least some of the write portions: an act of verifying whether the redundancy data is not consistent with the group of one or more logical time identifiers for that write portion; and if inconsistent, assigning a current logical time identifier to each of the logical time identifiers in the group of one or more logical time identifiers for that write portion in the logical time identifier structure, such that inconsistent write portions are treated as recently written to.

14. The computer program product in accordance with claim 13, the computer-executable instructions further structured such that, when interpreted by the one or more processors, cause the computing system to further instantiate and/or operate the following:
a backup component configured to backup the storage system to a particular logical time using the logical time identifier structure.

15. The computer program product in accordance with claim 13, the logical time identifier structure including an array of entries, including an entry that includes a logical time identifier for each of at least some of the portions of the storage system.

16. The computer program product in accordance with claim 13, the logical time identifier structure including a tree structure in which leaf nodes are each groups of logical time identifiers associated with write portions, each of at least some of the leaf nodes including corresponding redundancy data for the associated group of logical time identifiers.

17. The computer program product in accordance with claim 16, wherein if a group of logical time identifiers associated with a write portion is the same, then the write portion is not represented by a leaf node, but rather the value of the logical time identifier is represented at a parent node.

18. The computer program product in accordance with claim 13, the storage system being a block-based storage system, the unit portions of the storage system being blocks, and the write portion being a group of blocks.

19. A method for keeping track of changes amongst portions of a storage system, the method comprising:
for each unit portion in the storage system, associating a logical time identifier with the unit portion;
when writing to a particular write portion that includes one or more of the unit portions of the storage system, performing the following:
an act of updating the logical time identifier for any unit portion within the particular write portion that has changed;
an act of calculating redundancy data associated with a group of one or more logical time identifiers associated with the one or more unit portions of the write portion;
an act of writing to the write portion of the storage system;
an act of later verifying that the redundancy data is not consistent with the group of one or more logical time identifiers; and
if the redundancy data is not consistent, assigning a more recent logical time identifier to each of the logical time identifiers in the group of one or more logical time identifiers in the logical time identifier structure, such that inconsistent write portions are treated as more recently written to.

20. The method in accordance with claim 19, the logical time identifier structure including an array of entries, including an entry that includes a logical time identifier for each of at least some of the unit portions of the storage system.

21. The method in accordance with claim 19, the logical time identifier structure including a tree structure in which leaf nodes are each groups of logical time identifiers associated with write portions, each of at least some of the leaf nodes including corresponding redundancy data for the associated group of logical time identifiers.

22. The method in accordance with claim 21, wherein if a group of logical time identifiers associated with a write portion is the same, then the write portion is not represented by a leaf node, but rather the value of the logical time identifier is represented at a parent node.

* * * * *